United States Patent
Sung

(10) Patent No.: US 7,533,004 B2
(45) Date of Patent: May 12, 2009

(54) AUTOMATIC DETECTION OF PRODUCTION AND MANUFACTURING DATA CORRUPTION

(75) Inventor: Paul Sung, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/689,931

(22) Filed: Oct. 20, 2003

(65) Prior Publication Data

US 2004/0162686 A1   Aug. 19, 2004

Related U.S. Application Data

(60) Provisional application No. 60/419,608, filed on Oct. 18, 2002.

(51) Int. Cl.
*G06F 11/00* (2006.01)
(52) U.S. Cl. ..................................................... 702/188
(58) Field of Classification Search .................. 702/85, 702/188, 104; 379/1.04; 324/539
See application file for complete search history.

(56) References Cited

U.S. PATENT DOCUMENTS

| 5,572,424 A * | 11/1996 | Kellogg et al. ................. 701/29 |
| 6,370,455 B1 * | 4/2002 | Larson et al. .................. 701/33 |
| 6,571,191 B1 * | 5/2003 | York et al. ................... 702/107 |

OTHER PUBLICATIONS

Horowitz and Hill, Cambridge University Press, 1989, pp. 636-637.*

* cited by examiner

*Primary Examiner*—Bryan Bui
*Assistant Examiner*—Stephen J Cherry
(74) *Attorney, Agent, or Firm*—Workman Nydegger

(57) ABSTRACT

A distributed computing environment for calibrating multiple components and reliably generating calibration data about each of the components. The calibration data from a plurality of calibration devices is stored in a database in a manner that avoids the problem of data collisions. The calibration devices include specific components or modules that allow each calibration device to independently generate calibration data, buffer calibration data, archive calibration data, transmit and receive data signals from a database, and receive data signals from a global network and display them for an operator. A method is disclosed which generated calibration data and subsequently detects and corrects calibration errors within a distributed network in a time frame that avoids the unnecessary disposal of improperly calibrated devices.

4 Claims, 3 Drawing Sheets

AUTOMATIC DETECTION OF PRODUCTION AND MANUFACTURING DATA CORRUPTION

CROSS-REFERENCE TO RELATED APPLICATIONS

This application claims the benefit of U.S. Provisional Application Ser. No. 60/419,608, filed Oct. 18, 2002, which is incorporated herein by reference.

BACKGROUND OF THE INVENTION

1. The Field of the Invention

The present invention generally relates to the field of distributed computing and production environments. More particularly, the present invention relates to an apparatus and method that enables devices disposed in a distributed environment to accurately and efficiently identify data corruption.

2. The Relevant Technology

Distributed environments are widely used to operably interconnect various components, such as computers or other devices, via a communications network. One application where distributed environments may be advantageously employed is in calibrating manufactured components prior to packaging and sale. Calibrating and analyzing manufactured components is typically necessary to ensure that they have been correctly manufactured and are ready for use. A typical distributed calibration environment may comprise a central control unit disposed at one location, such as the headquarters of a company, and several component calibrating devices, used to calibrate and analyze the components, that are located in one or more remote locations. The various components of this distributed environment are operably connected via a communications network, such as the Internet, for example.

The distributed calibration environment described above is often used because it allows for the calibration of the components on-site at the remote manufacturing facility before shipping them elsewhere. Thus, any problems that are detected through analysis may be corrected at the point of manufacture. This is often found to be the most economical method for component calibrating.

Notwithstanding their economy, however, distributed calibration environments also present various challenges. For instance, it is often necessary for each calibrating device disposed in the distributed testing environment to report various statistics to the central control unit. These statistics most often relate either to the function of the calibrating device in evaluating the functionality of the manufactured component, or to the analysis of the component itself. For example, component yield (pass rate) and device calibration are two such statistics that may need to be reported to the central control unit by each calibrating device. These statistics typically are manually transmitted by an operator or technician to the control unit via a communications network. The manual nature of this reporting consumes valuable time and resources that could be better spent elsewhere. Further, because of the amount of time it requires, manual reporting of pertinent statistics from each testing device to the control unit delays the speed at which the control unit can compile the reported information for analysis by a technician. Not only does this further waste resources, but it also prevents the timely discovery and response to problem conditions that may exist in one or more calibrating devices or manufactured components. This may result in unnecessary over-rejecting of manufactured components that are in fact acceptable for use, or worse, under-rejecting of manufactured components, wherein defective components erroneously pass the testing cycle and are approved for packaging and sale.

Another problem typically associated with distributed networks relates to data formatting and storage. Data from each of the various devices must be formatted into a common format before it can be transmitted to a permanent database for analysis and comparison purposes. Therefore, most networks utilize some form of flat file or intermediate storage location for information to be collected. Unfortunately, the use of a single flat file with multiple clients introduces collision problems when more than one device attempts to write to the file at the same time. Existing software has been developed to minimize the amount of collision problems but it cannot completely prevent data loss from occurring in this scenario. For example, if calibration data is concurrently being generated by multiple devices, each of the devices will attempt to write to the file at the same time. The software may be able to prevent this collision by only allowing one device to the write to the file at a time. However, during this lag time in which the other devices are prevented from writing to the file, additional calibration data may be generated that could overwrite the original calibration data. Therefore, calibration data could be lost even if the collision to the one flat file is prevented.

A need therefore exists for a method by which the corruption of component analysis data can be efficiently identified and rectified. The method should include the ability to transmit data from a central network location to one or more devices disposed in a remote location of a distributed environment. In addition, the method should minimize or prevent the possibility of data loss due to collisions.

BRIEF SUMMARY OF EMBODIMENTS OF THE INVENTION

These and other problems in the prior art are addressed by embodiments of the present invention, which relates to a distributed computing environment for calibrating multiple components and reliably generating calibration data about each of the components. The distributed environment is configured to reliably store calibration data from a plurality of calibration devices without the possibility of data collisions. The calibration devices are used in a distributed manufacturing or testing environment. The manufacturing or testing environment described herein provides the necessary infrastructure to identify corruption and calibration errors in components before they are unnecessarily discarded. The present invention further includes a method for detecting and correcting calibration errors within a distributed network.

According to one aspect of the invention, the calibration device includes a software module, a file, a data filter and a data link. The software module interfaces with a hardware device to perform particular testing and calibration procedures on a component. The components are individual manufactured objects that must be further calibrated to be ready for sale or distribution. The file receives the calibration data from the software module regarding a particular component. The data filter reorganizes the calibration data within the file to a particular format that can be compared with other calibration devices. In addition, the data filter informs an operator when errors or corruption is detected in the calibration data. The data link connects the calibration device to a distributed network of computing devices.

A distributed network includes one or more calibration devices, a database, and a global network. The calibration devices are configured to execute testing and calibration procedures on a component and generate calibration data about the component. The database is configured to be accessible at any location within the distributed network. The global network is a group of computer devices that are interconnected and have the ability to monitor the calibration data within the database. The global network is also connected to the calibration devices such that a computer device within the global network can send data signals to one or more of the calibration devices.

The method of detecting and correcting calibration errors within a distributed network initially includes performing testing and calibration procedures on a component such that calibration data is generated from the procedures. Second, the method includes storing the calibration data in a database such that the calibration data is organized in a standard format that can be compared with other calibration data from other calibration devices. Third, the method includes identifying errors in the calibration data. Fourth, the method includes informing an operator of any relevant errors detected in the calibration data in a time frame such that the operator can re-perform the testing and calibration procedures on a component in the proper manner.

In this manner, the systems of the invention enable administrators of distributed manufacturing or testing systems to efficiently identify errors in the process of calibrating or testing manufactured components. The existence of such errors or associated corrupted calibration data can be discovered during the calibration or testing process, which permits the errors to be corrected. Thus, the invention can significantly reduce the likelihood that calibration or testing errors will remain unnoticed and, consequently, can significantly reduce the possibility of defective components being approved for sale and distribution to customers.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to an apparatus and method that enables devices disposed in a distributed environment to accurately and efficiently identify errors and data corruption. The method and apparatus must enable an operator of a device to be informed of the errors or corruption in a relatively short time frame to avoid the unnecessary loss of one or more components due to the same errors or corruption. In addition, the method should enable the errors or data corruption to be quickly corrected. Also, while embodiments of the present invention are described in the context of distributed networks for calibration and testing procedures, it will be appreciated that the teachings of this invention are applicable to other applications as well.

Figure 1:
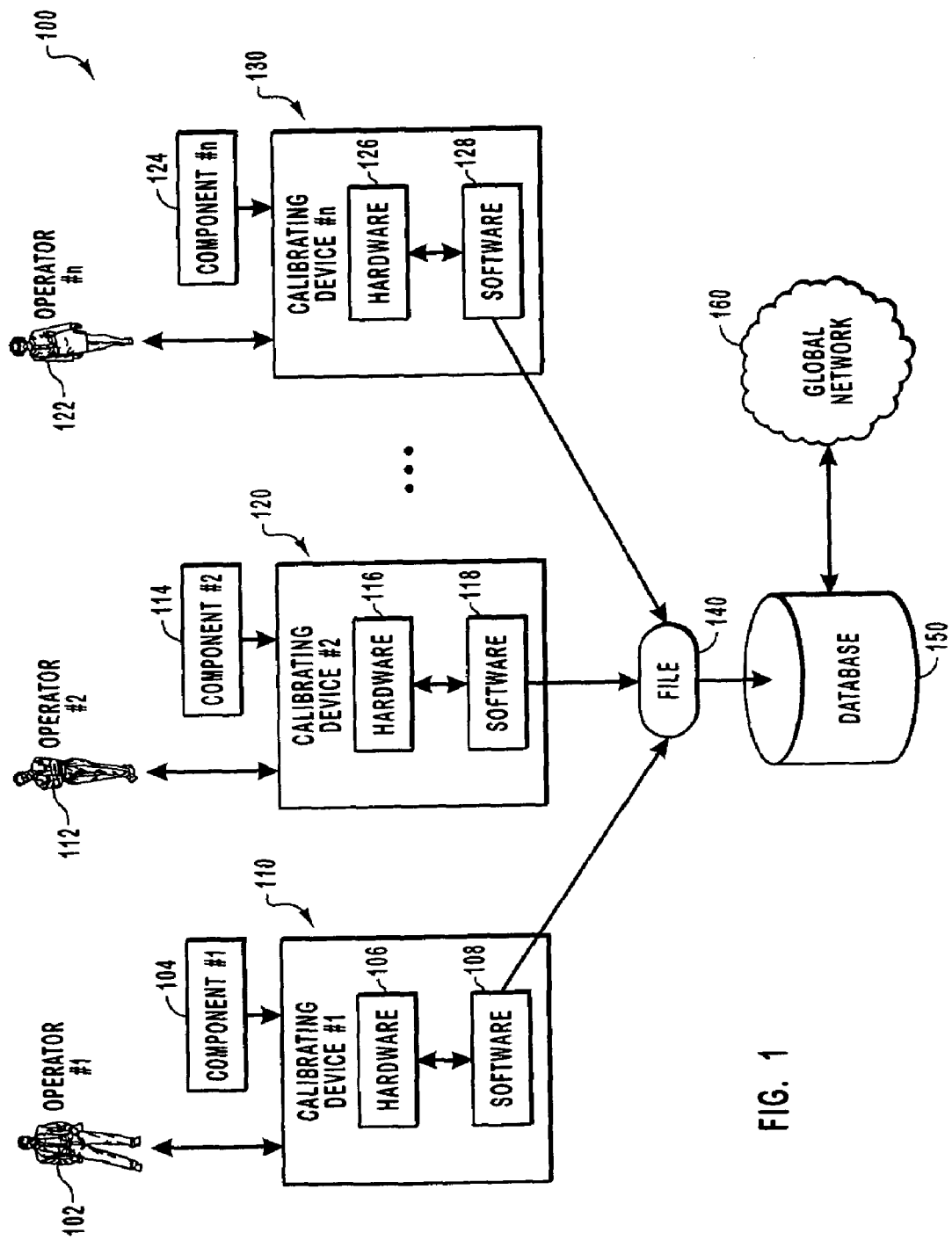
FIG. 1 illustrates a schematic diagram of a multi-client, single file distributed networking environment in which multiple calibrating devices output data to the same file.

Reference is initially made to FIG. 1 which illustrates a schematic diagram of a multi-client, single file distributed networking environment, designated generally at 100. FIG. 1 represents a conventional solution to the problem of correlating data in a distributed network. The illustrated system shares a single file of calibration data between multiple calibration devices (clients) for consistently formatting the calibration data from each of the devices. Therefore, as each of the calibration devices generate calibration data, it is formatted and uploaded to the file 140. As will be discussed in further detail below, this system has numerous disadvantages and inefficiencies in comparison to the single client, single file embodiment of the present invention illustrated in FIG. 2.

The multi-client, single file distributed network 100 further includes a plurality of operators (#1 102, #2 112, #n 122), a plurality of components (#1 104, #2 114, #n 124), a plurality of calibration devices (#1 110, #2 120, #n 130), a file 140, a database 150, and a global network 160. Although FIG. 1 shows only three operators, components and calibration devices, it is understood that there can be an essentially unlimited series of these objects. The components 104, 114, 124 are various optical, electrical and mechanical components which need to be properly calibrated in order to function properly or tested in order to be reliably used, distributed or sold. The operators 102, 112, 122 are human beings that perform the manual procedures of transporting components from one calibration device to another depending on the type of component and the calibration data generated by each of the components. The components 104, 114, 124 are generally transported in lots or larger groupings for efficiency purposes. The calibration devices 110, 120, 130 are devices which perform various testing and calibration procedures on one or more components which are inserted into them by an operator. For example, calibration device 110 performs testing and calibration procedures on component 104 which is manually inserted into it by the operator 102.

The calibrating devices of FIG. 1 can be implemented in a system that uses automated manufacturing systems (AMS) to automate the production steps and the calibration and testing steps in the process of manufacturing mechanical, electrical, optical, or electro-optical components. In such systems, the calibrating device can be included in the AMS or can itself be an AMS. An automated manufacturing system is equipped with an industrial PC and a bar-code scanner, and may include one or more instruments for calibrating, testing and measurement of the manufactured component. It may also include one or more specialized peripheral devices (e.g., an industrial label printer). An AMS can cover one or more calibration or manufacturing steps for a range of products depending on its hardware and software configuration. An AMS is connected to the corporate network and is accessible to Internet through Internet servers and firewalls.

With continued reference to FIG. 1, the calibration devices 110, 120, and 130 further include a hardware device or module 106, 116, 126 and a software module 108, 118, 128. The hardware device 106, 116, 126 and the software module 108, 118, 128 could also be combined together to simply form a module. The hardware device 106, 116, 126 of each calibration device may be any form of hardware testing equipment such as but not limited to a mechanical stress analyzer or an optical spectral analyzer. The hardware device 106, 116, 126 is configured to perform testing or calibration procedures on the components 104, 114, 124. The software module 108, 118, 128 of each calibration device is a software program residing on a computer device that controls how the hardware device performs the testing and calibration procedures on the component. In addition, the software module 108, 118, 128 controls how the calibration device generates a set of calibration data which is transported to the file 140. Therefore, the software module 108, 118, 128 is linked to both the hardware device 106, 116, 126 and the file 140. Generally, the software module 108, 118, 128 includes at least two different versions of a calibration software that indicate different testing or calibration procedures to be performed on a particular component. To prevent incompatible data problems on the file 140, each software module 108, 118, 128 contains a table indicating which software version to use based on the type of component that is being calibrated. This allows a new version of software to be installed on all of the calibration devices before it is utilized to actually calibrate components. In addition, the software module 108, 118, 128 and the hardware device 106, 116, 126 include a means for receiving a message from an external source and displaying the message in visual format for an operator to view. The means for receiving a message include but are not limited to a wired data link or a wireless air interface. The external source is a network administrator remotely located from the calibration device 110, 120, 130. The message is displayed in a visual format by projecting the message onto a display device such as a CRT based monitor, a flat screen, or a LCD readout. The message may be in any format such as ANSI text, text, numeric code, alphanumeric, HTML, etc.

The file 140 is a "flat file" used to temporarily store formatted data from each of the calibration devices 110, 120, 130. For example, file 140 is a comma-delineated text file in which each line corresponds to a data entry from each of the calibration devices. Naturally, this format allows the data to easily be viewed in a spreadsheet application for further analysis. One of the main problems with this type of distributed calibration system is in how the data from each of the calibration devices 110, 120, 130 is stored on the file 140. Occasionally, multiple calibration devices may attempt to store data on the file 140 at the same time. This event is referred to as a "collision" because the data storage request from each of the calibration devices collide with one another. To mitigate this problem, various software routines are included in almost all operating systems. For example, Microsoft Windows will only allow one client to edit a single document at a time; if additional clients request to edit the document, they will only be allowed to view the document. Unfortunately, none of these types of software solutions guarantees that data will not be lost in a collision event. Even though a direct collision between two storage requests is avoided by the software solutions, the software solutions do not provide a method for temporarily storing the data from the one or more devices that are denied their request to store data.

Therefore, it is still possible for data to be lost or overwritten in the lag time between when one calibration device is allowed to write to the file 140 and the other devices are blocked from writing to the file.

The database 150 or external storage source stores the contents of the file 140 in a location that can be viewed by any remote computer device connected to the Global Network 160. The database 150 will transfer the contents of the file 140 into the database 150 in response to a predetermined criteria. The predetermined criteria may be particular times or in response to particular events. For example, the database 150 can be configured to automatically transfer the contents of the file 140 to the database 150 every 5 minutes. The database 150 is a Datasweep database that provides numerous access capabilities and formats. The Global Network 160 represents a network of remotely located computer devices connected by some form of connection means. For example, the Internet can be used to set up a global data network between computers located in remote locations such that the computer can instantaneously communicate with one another.

Figure 2:
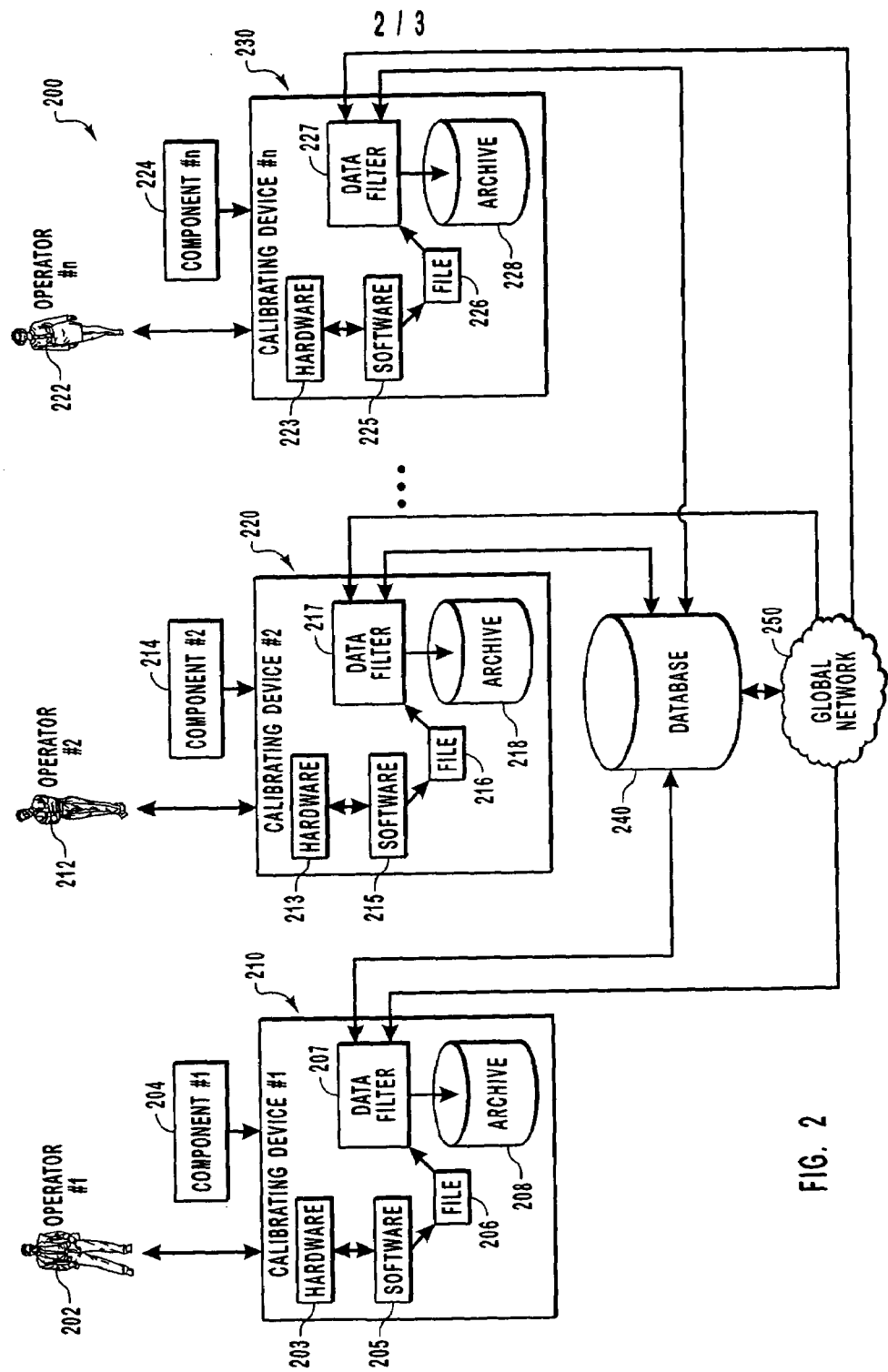
FIG. 2 illustrates a schematic diagram of a single client, single file distributed networking environment in which each calibrating device utilizes a data filter to properly organize data before its transmitted to a database.

Reference is next made to FIG. 2 which illustrates a schematic diagram of a single client, single file distributed networking environment, designated generally at 200. This distributed networking environment is referred to as single client, single file because each of the clients have an individual flat file embedded within them as opposed to sharing the same flat file. This prevents collisions because there is no way for the different clients to ever attempt to write data to the same file. Eventually, the data from each of the files is transferred to a database which can accept input from multiple clients at the same time. As described below, this distributed environment is more efficient and more reliable for storing data than the environment described in reference to FIG. 1.

The single client, single file distributed networking environment 200 further includes a plurality of operators (#1 202, #2 212, #n 222), a plurality of components (#1 204, #2 214, #n 224), a plurality of calibration devices (#1 210, #2 220, #n 230), a database 240, and a global network 250. Although FIG. 2 shows only three operators, components and calibration devices, it is understood that there can be an essentially unlimited series of these objects. The components 204, 214, 224 are various optical, electrical and mechanical devices which need to be properly calibrated in order to function properly or tested in order to be reliably used, distributed or sold. The operators 202, 212, 222 are human beings that perform the manual procedures of transporting components from one calibration device to another depending on the type of component and the calibration data generated by each of the components. The components 204, 214, 224 are generally transported in lots or larger groupings for efficiency purposes. The components and operators illustrated in the distributed environment of FIG. 2 are essentially the same as the components and operators illustrated in the distributed environment of FIG. 1. The calibration devices 210, 220, 230 are devices which perform various testing and calibration procedures on one or more components which are inserted into them by an operator. However, unlike the calibration devices described in reference to the distributed environment of FIG. 1, the calibration devices 210, 220, 230 contain additional components that allow them to internally store and process data generated by the individual calibration devices.

The calibration devices 210, 220, 230 each include a hardware device 203, 213, 223, a software module 205, 215, 225, a file 206, 216, 226, a data filter 207, 217, 227, and an archive 208, 218, 228. The hardware device 203, 213, 223 and the software module 205, 215, 225 could also be combined together to simply form a module. The hardware device 203, 213, 223 and software module 205, 215, 225 are substantially similar to the hardware and software components described in reference to FIG. 1. Essentially, the hardware device 203, 213, 223 represents the actual calibration device which physically interacts with the component 204, 214, 224. The software module 206, 216, 226 interfaces with the hardware device 203, 213, 223 to generate data based upon the Interaction between the hardware device 203, 213, 223 and the component 204, 214, 224. Unlike the software components illustrated in FIG. 1, the software module 205, 215, 225 also interfaces with an internal file 206, 216, 226 rather than an external shared file. The file 205, 215, 225 stores the data from the software module 205, 215, 225 in a comma-delineated text format. The data filter 207, 217, 227 periodically transfers the contents of the file 205, 215, 225 to the database 240, which is shared between all of the calibration devices 210, 220, 230. The process performed by the file 206, 216, 226 of storing and then transferring its contents to the database 240 is referred to as a "circular buffer" technique. The data filter 207, 217, 227 also archives the data from the file 206, 216, and 226 into the archive or archive storage device 208, 218, 228 before it is deleted. The archive 208, 218, 228 is a storage device such as a hard disk or a write-able optical storage device. This "distributed archiving" technique allows each calibration device 210, 220, 230 to independently store a copy of the raw data for a certain length of time. The archiving scheme includes deleting old outdated data that is unlikely to be used again and storing the current set of data. This configuration ensures that no data is ever lost or corrupted due to collisions between multiple calibration devices attempting to write to a shared file. The data filter 207, 217, 227 performs numerous functions without input from a user interface thereby acting like an "intelligent agent".

The software module 205, 215, 225, file 206, 216, 226, data filter 207, 217, 227, and archive 208, 218, 228 are all incorporated into an embedded personal computer (not shown) that resides within each of the calibration devices 210, 220, 230. This provides an inexpensive platform upon which the necessary components of the calibration devices 210, 220, 230 can reside. The software portions of the components can be stored on a hard disk which has additional space to archive the raw data. In addition, the personal computer is equipped with a standard interface that is used to connect with the hardware device 203, 213, 223. This standard interface includes but is not limited to a serial port, a parallel port, a USB port, an infrared port, or a RJ port. Likewise, the interface between the data filter 207, 217, 227 and the database 240 utilizes a standard interface located on the personal computer to connect with the database 240.

The database 240 is, for example, a Datasweep database that allows the contents of the database to be viewed by numerous computers located on the global network 250. The database 240 establishes a two-way communication path with each of the calibration devices 210, 220, 230 such that information can be sent and received by the database 240. This allows the standardized raw data to be uploaded from each of the calibration devices 210, 220, 230 to the database while also allowing the database to transmit messages to the calibration devices 210, 220, 230. The database 240 and the global network 250 are connected via a long distance data carrier or data link such as the Internet. This allows any device within the global network 250 to access the database 240. Computer devices located on the global network 250 also have the ability to communicate directly with the individual calibration devices 210, 220, 230 to transmit information pertaining to the data generation at a particular calibration device. For example, if a data analyzer notices that calibration device #1 210 is producing an inordinate amount of unsatisfactory components #1 204, the data analyzer could transmit a message through the global network 250 to the calibration device #1 210 directly, instructing the operator #1 202 to reconfigure a particular portion of the calibration device #1 210 such as the hardware device 203.

Figure 3:
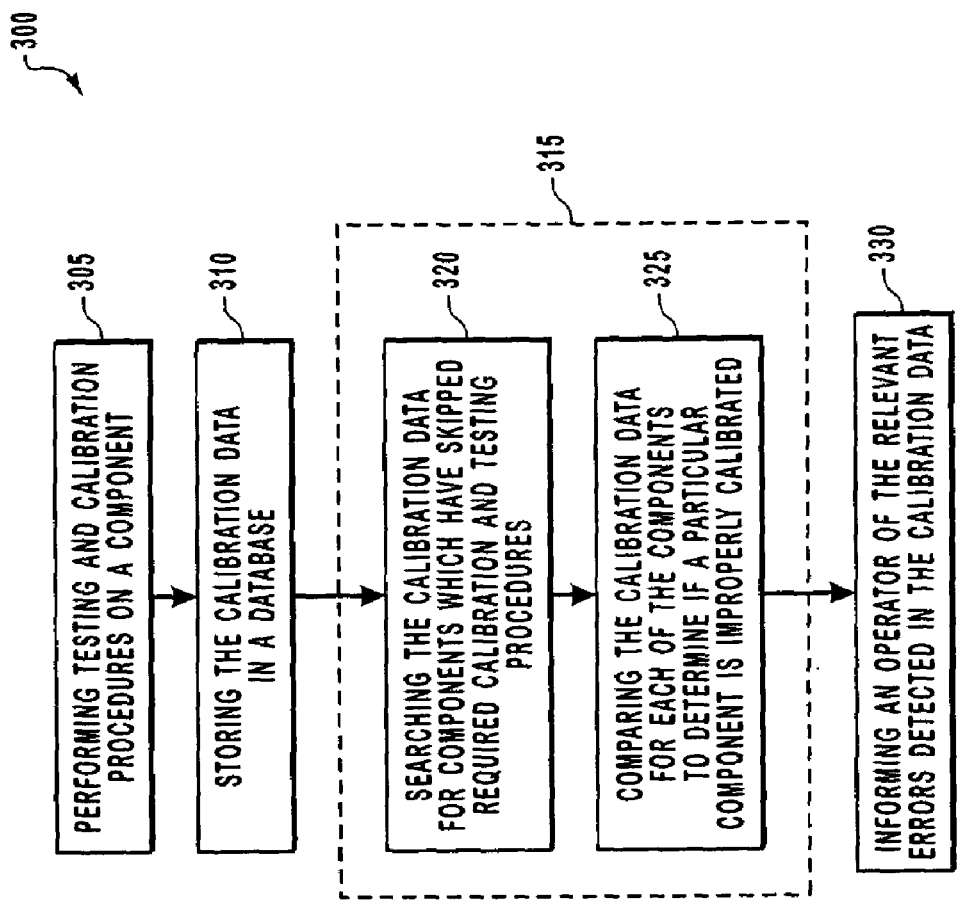
FIG. 3 illustrates a logical flow chart illustrating the acts that comprise a method of generating calibration data and subsequently detecting and correcting calibration errors within a distributed network.

Reference is next made to FIG. 3, which illustrates a logical flow chart illustrating the acts that comprise a method of generating calibration data and subsequently detecting and correcting calibration errors within a distributed network, designated at 300. This process can be used in the distributed computing environments illustrated in FIGS. 1 and 2. It is important to identify calibration errors in an efficient manner so as to salvage components that may otherwise be discarded. The method 300 begins with the act of performing testing and calibration procedures on a component 305. This act is performed by a calibration device that is connected to the distributed network. Second, the act of storing a set of calibration data in a database 310 is performed. The calibration data is generated by a software module located in the calibration device that is in data communication with a hardware device which performs the testing and calibration procedures on the component. Third, the act of searching the calibration data for components which have skipped required calibration and testing procedures 320 is performed. Components skip required or crucial calibration and testing procedures if an operator fails to perform the necessary procedures or improperly routes the components before the procedures are performed. This act involves analyzing the calibration data to determine which procedures are performed by the calibration devices upon the components and determining if any procedures are missing. This act is performed by a computer device connected to the global network, the database, or the data filter. Fourth, the act of comparing the calibration data for each of the components to determine if a particular component is improperly calibrated 325 is performed. It is possible to analyze the calibration data individually and identify components which exhibit unusual characteristics indicating that they are improperly calibrated. The acts of searching the calibration data for components which have skipped required calibration and testing procedures 320 and comparing the calibration data from each of the components to determine if a particular component is improperly calibrated 325, can be combined to form the step for identifying errors in the calibration data 315. Fifth, the act of informing an operator of the relevant errors detected in the calibration data 330 is performed. The operator is informed by transmitting a message to the individual calibration device which the targeted operator is working on. The message is then displayed on a screen which is visually communicated to the operator. The message includes instructions pertaining to the steps that an operator should follow in order to correct the errors in the calibration data. In addition, the act of informing an operator is performed in real time to minimize the amount of repeated mistakes made by the operator and the potential loss of components which are improperly characterizes as defective. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for managing data, the method comprising:

over a distribution network comprising a plurality of calibration devices, obtaining calibration data from each calibration device and temporarily archiving the calibration data locally at each calibration device, generation of the calibration data being achieved in connection with physical interactions between the calibration devices and respective associated components;

receiving, over the distributed network, the calibration data from one or more of the plurality of calibrating devices;

storing the calibration data received from the one or more calibrating devices in a database such that the calibration data is organized in a standard format that can be compared with other calibration data;

comparing calibration data from one calibration device with calibration data from another calibration device; and enabling the calibration data to be accessed by one or more network devices of a global network.

2. The method of claim 1, further comprising transmitting a message to one of the calibrating devices.

3. The method of claim 1, wherein calibration data is received concurrently from two or more of the plurality of the calibrating devices.

4. The method of claim 1, wherein at least a portion of the method is performed at a point of manufacture of a component in connection with which some of the calibration data is obtained.

* * * * *